Figure 9:
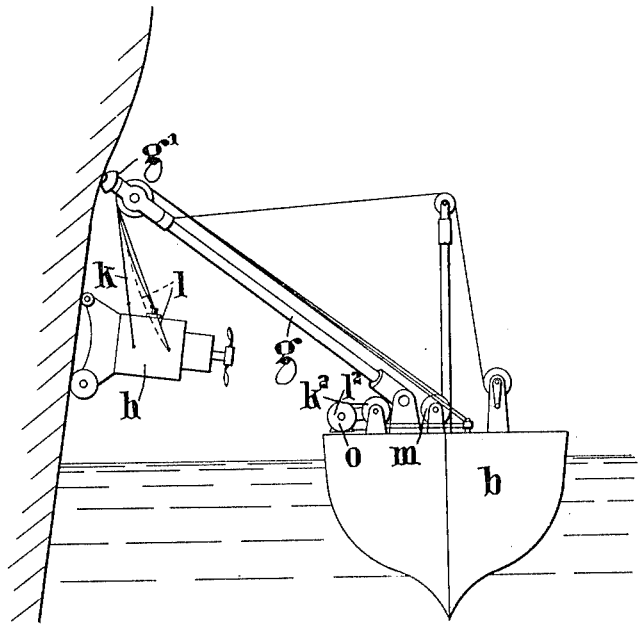

F. G. BROWNE.
APPARATUS FOR CLEANING THE HULLS OF SHIPS OR ANY KIND OF VESSEL.
APPLICATION FILED AUG. 5, 1912.
1,079,208.
Patented Nov. 18, 1913.
5 SHEETS—SHEET 1.
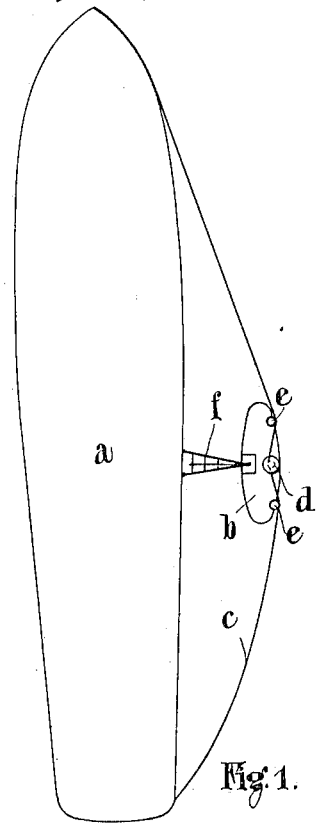
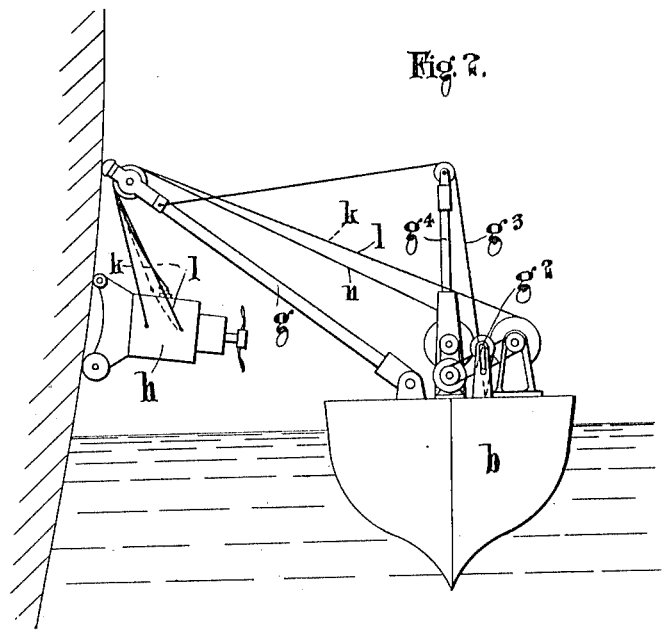
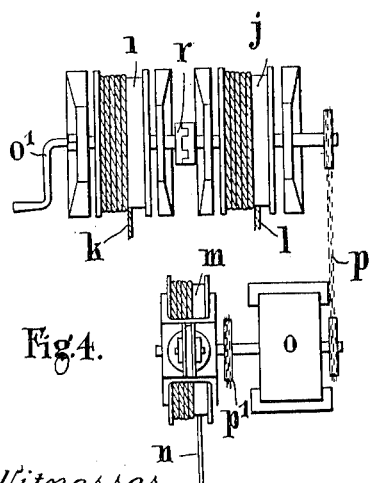
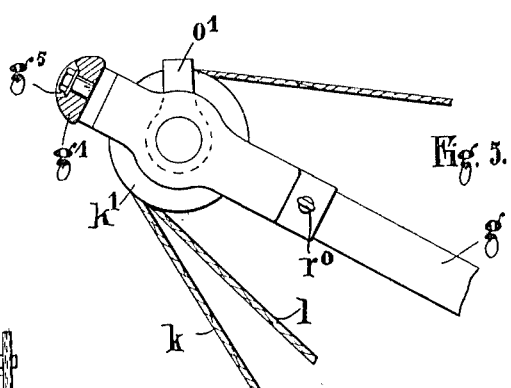
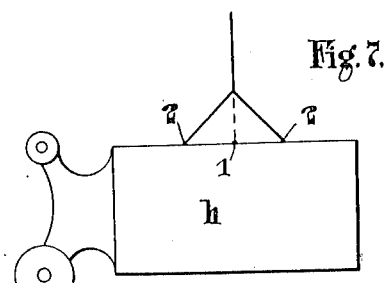
Witnesses
C. B. McGee.
William E. Tucker.
Inventor.
Frederick George Browne
By Emil Bonnely the
Attorney.

F. G. BROWNE.
APPARATUS FOR CLEANING THE HULLS OF SHIPS OR ANY KIND OF VESSEL.
APPLICATION FILED AUG. 5, 1912.
1,079,208.
Patented Nov. 18, 1913.
5 SHEETS—SHEET 2.
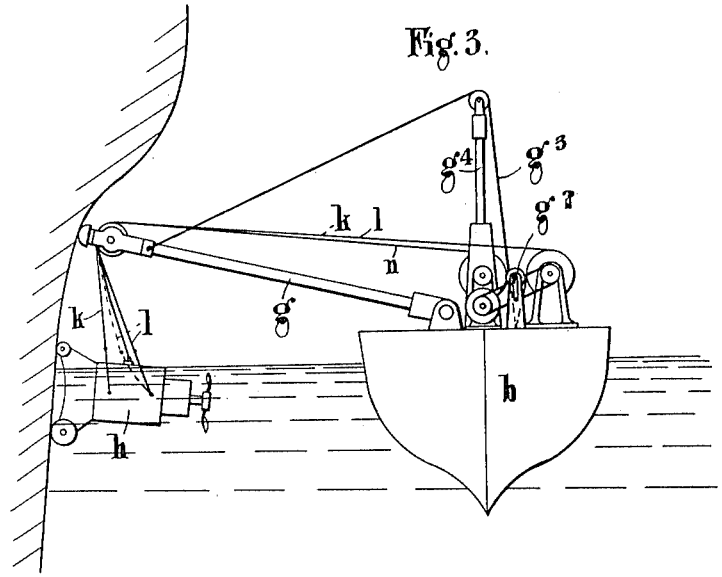
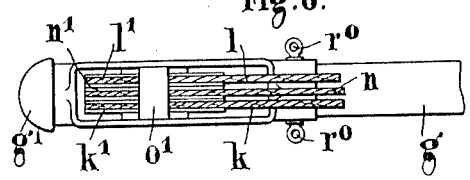
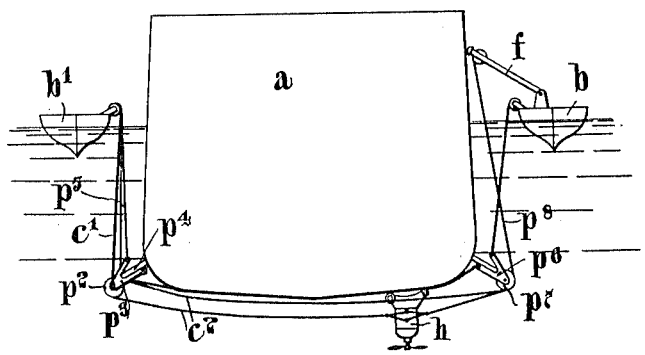
Witnesses.
Inventor.
Frederick George Browne F. G. BROWNE.
APPARATUS FOR CLEANING THE HULLS OF SHIPS OR ANY KIND OF VESSEL.
APPLICATION FILED AUG. 5, 1912.

1,079,208.

Patented Nov. 18, 1913.

5 SHEETS—SHEET 3.

Witnesses.
E. J. McGee.
William E. Tucker.

Inventor.
Frederick George Browne
By Emil Bauer, his Attorney.

F. G. BROWNE.
APPARATUS FOR CLEANING THE HULLS OF SHIPS OR ANY KIND OF VESSEL.
APPLICATION FILED AUG. 5, 1912.

1,079,208.

Patented Nov. 18, 1913.

5 SHEETS—SHEET 4.

Witnesses.
E. H. McBee.
William E. Tucker.

Inventor.
Frederick George Browne
By Emil Bonnelycke
Attorney.

UNITED STATES PATENT OFFICE.

FREDERICK GEORGE BROWNE, OF MALVERN, NEAR MELBOURNE, VICTORIA, AUSTRALIA.

APPARATUS FOR CLEANING THE HULLS OF SHIPS OR ANY KIND OF VESSEL.

1,079,208.                    Specification of Letters Patent.         Patented Nov. 18, 1913.

Application filed August 5, 1912.    Serial No. 713,308.

*To all whom it may concern:*

Be it known that I, FREDERICK GEORGE BROWNE, a subject of the King of Great Britain and Ireland, and residing at 38 Lambeth avenue, Malvern, near Melbourne, in the State of Victoria, Australia, have invented certain new and useful Improved Apparatus for Cleaning the Hulls of Ships or any Kind of Vessel, of which the following is a specification.

This invention relates to apparatus for cleaning the hulls of ships, vessels or the like, of the type in which a self acting cleaning device is suspended from a crane or derrick mounted upon a support exterior of the ship to be cleaned. In such apparatus as hitherto proposed, the self acting cleaner suspended from a floating lighter, normally hangs vertically and is pressed toward the hull by hand or mechanically operated devices in order that the cleaner may perform the work of removing the marine growth upon the hull of the ship. Such growth clings very tenaciously and requires a considerable amount of force to remove it. It has been found in practice by the devices hitherto proposed, that if the cleaner is forced on to the hull with any considerable force, such force is nullified by the insecure nature of the support carrying the apparatus, in other words, the lighter gives way in the opposite direction.

The object of the present invention is to overcome this drawback, and it primarily consists in so suspending the self acting cleaner that it is normally kept pressed against the hull by the influence of its own weight.

The invention also consists in providing means whereby when a floating lighter is used, it may be held rigidly to the hull being cleaned or may be moved along the hull when and as desired.

The invention further consists in means whereby the pressure of the self acting cleaner against the hull may be regulated.

Reference will now be made to the accompanying drawings illustrating the present invention diagrammatically and by way of example, in which:—

Figure 13:
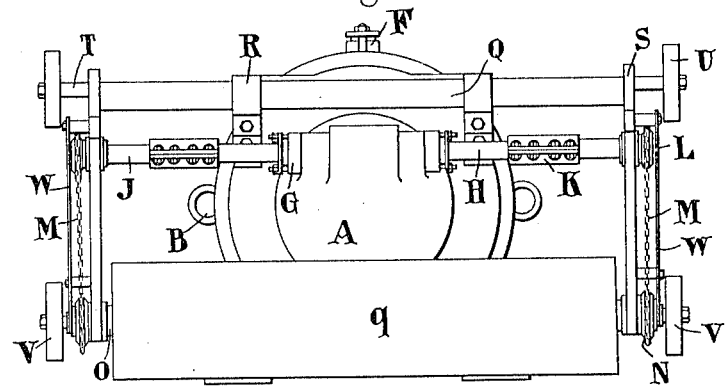
Figure 10:
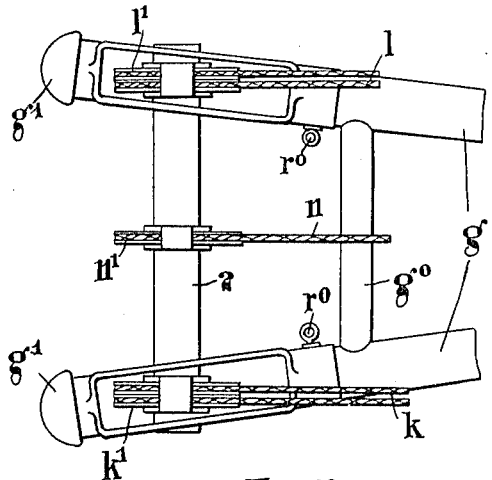
Figure 14:
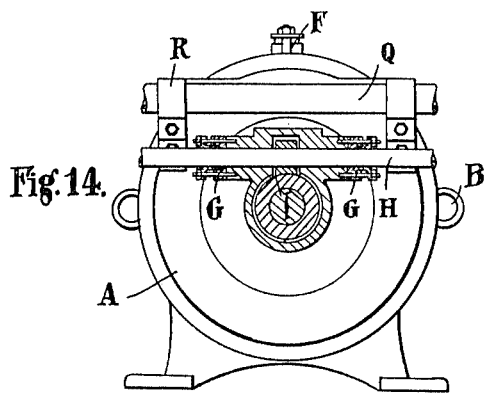
Figure 15:
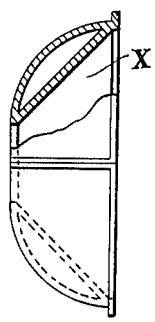
Figure 11:
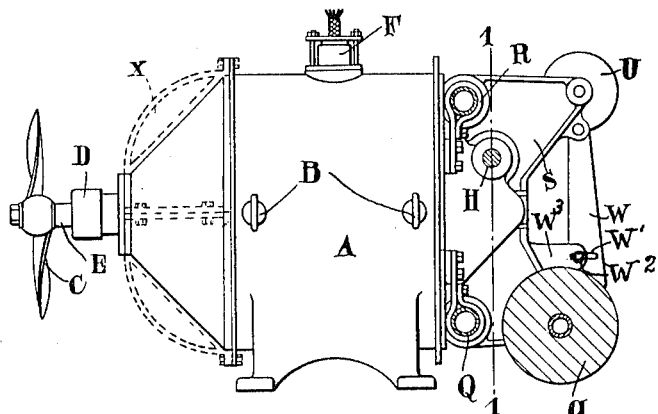
Figure 12:
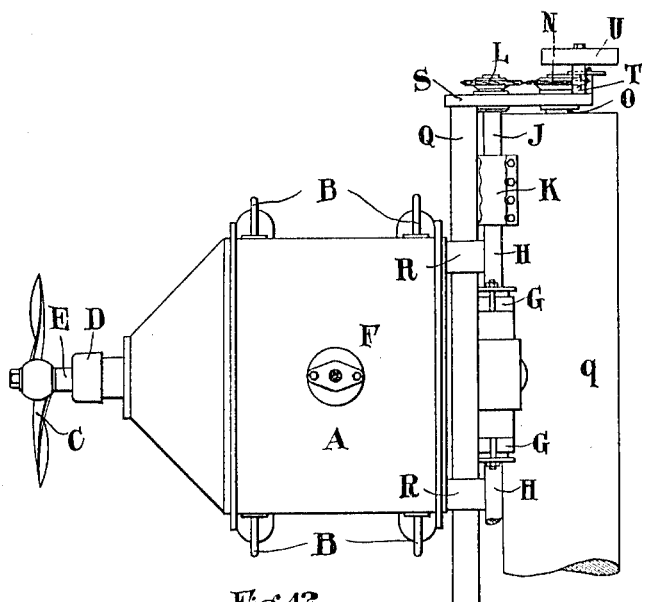

Figure 1 is a plan view showing the general arrangement when a punt, lighter, boat or the like is used in cleaning the hull of a ship. Fig. 2 is an end elevation thereof, drawn to a larger scale, but showing a single arm derrick. Fig. 3 is a similar view, but showing the counter of a ship. Fig. 4 shows a partial plan of one form of gear for operating the cleaning device, when using a single arm derrick. Figs. 5 and 6 show the free end of a single arm derrick in elevation and plan respectively. Fig. 7 is a diagram of two alternative ways of suspending a cleaning device. Fig. 8 is an end view of a general arrangement suitable when cleaning the bottoms of ships. Figs. 9 and 10 are a side elevation and a partial plan respectively of one form of the double or forked arm derrick and gear of Fig. 1. Figs. 11, 12 and 13 are respectively side elevation, plan and front elevation of a cleaning device, some parts being omitted, and Fig. 14 is a section on line 1—1 Fig. 11. Fig. 15 is a side elevation of one form of a detachable air chamber.

In Fig. 1 $a$ is the ship to be cleaned and $b$ is a punt, lighter or boat adapted to be moved along the side of the ship by means of a cable, hawser or the like $c$, connected to the latter in any suitable manner and passing one or more times as desired around a hand or power, but preferably an electric, winch or the like $d$ and over or around loose pulleys $e$. A derrick $f$ or the like preferably electrically operated and the arm $g$ of which (Figs. 2 and 3) is preferably mounted in any suitable manner so as to be adjustable to any desired angle and, if desired, is also adapted (not shown) to swing or rotate about a vertical axis, is mounted in or on the punt $b$ or the like and is adapted to raise and lower a cleaning device $h$, hereinafter referred to, and also to regulate or, in conjunction with rollers V and, when working under water, propeller C hereinafter mentioned, to assist to regulate, the pressure of the actual cleaning member or members thereof against the hull of the ship.

The derrick arm $g$, when adjustable, is adapted to be raised and lowered preferably by means of a separate electric or hand operated winch $g^2$, indicated diagrammatically in Figs. 2 and 3, and a steel or any other cable or the like $g^3$ which passes from the winch $g^2$ over a loose pulley suitably mounted on an upright $g^4$, for example of steel tubing, and thus to the derrick arm $g$, being preferably connected on both sides at or near the free end thereof in any suitable manner to permit of the arm being readily moved, for instance, by means of fixed or movable rings $r^\circ$, $r^\circ$ (Figs. 5 and 6).

Referring to Fig. 4, $i$ and $j$ are drums for unwinding or winding up respectively the front and rear supporting cables, chains or the like $k$, $l$, while $m$ is a drum adapted to let out or draw in a conveyer or conveyers $n$ for transmitting power to the cleaning device $h$ as the latter is lowered or raised, these three drums being driven by any kind of motor, but preferably by an electric motor $o$ through the medium of a chain or other drive $p$, $p'$, although, if desired, they may be operated by hand, for instance, by a crank or cranks. Such conveyers $n$ may, if desired, be electric wires preferably formed into a single cable, a flexible shaft or a pipe for conveying pressure fluid to, and actuating, the cleaning device including the aforementioned propeller.

By suitable adjustment of the cables or the like $k$ and $l$, the pressure of the actual cleaning member or members $q$, such as a brush or brushes or the like, against the ship's hull is, as desired, either entirely or partly regulated. For this purpose, the drums $i$ and $j$ may, for instance as shown in Fig. 4, be adapted to be rotated independently of one another by disconnecting a clutch $r$ or other suitable device, the drum $i$ or $j$ as required, then being rotated in the desired direction respectively by the motor $o$ or a detachable crank $o'$ or other device, so that the cable or the like $k$ or $l$ is either drawn in or let out as required or both are adjusted relatively to one another, some suitable arrangement being provided, for example, a clutch (not shown) to enable the conveyer $n$ to remain unwound at least to the same extent or length as the cable $k$ or $l$ which is let out to the greatest extent at the time being, or the unwound part of the conveyer $n$ is always more or less slack to give it a length which will allow of the cables $k$, $l$ being drawn in and let out as desired without the conveyer $n$ being subjected to any undue strain.

In Fig. 2 the rear cable or the like $l$ is shown slackened in dotted lines in order that the member or members $q$ press more heavily on the ship's hull whereby the "cut" is increased.

In a modification shown diagrammatically in Fig. 7, the point 1 or points 2, 2 of suspension on the cleaning device $h$ are adapted to be adjusted laterally of the ship in order to alter, or assist to alter, the angle of inclination of the cleaning device, and consequently the pressure of the member or members $q$ against the ship's hull. The point 1 or points 2, 2 might be duplicated and arranged at the sides of the cleaning device $h$.

Figs. 5 and 6 show the free end of the derrick arm $g$ which is provided with a roller $g'$ or slide or other suitable device adapted to rest and move readily, when required, against the hull as the derrick is moved relatively to the ship or the like being cleaned. The roller $g'$ shown and which is of rubber composition or any other suitable material, has a hole in the center through which a bolt passes provided with a nut and washer accommodated in a recess $g^5$, the arrangement being such that the roller $g'$ can move readily when required. The cables or the like $k$, $l$ as well as the conveyer or conveyers $n$ pass over separate pulleys $k'$, $l'$ and $n'$, a guard $o'$ or the like being provided, if required, to retain them on their respective pulleys.

Fig. 8 shows a modification for cleaning the bottoms of ships or the like, the cleaning device $h$ being preferably provided with an air chamber or air chambers, which is or are preferably detachable as hereinafter described. A loose pulley $p^2$ or the like is, for example, suitably suspended by a cable or the like $c'$ from a boat or any other support $b'$ and a cable or the like $c^2$ passed over this pulley and its ends connected to the cleaning device $h$, the cable $c^2$ or the like being actuated by the derrick $f$ to draw the cleaning device $h$ to and fro as desired across the bottom of the ship $a$ by means of the cable $c^2$, or where the shape of the ship's bottom does not permit of this, each half thereof is cleaned separately in a similar manner, for example, from the starboard and port side of the ship respectively. The unwound length of cable $c^2$ or $c'$ or both, being altered as desired to regulate, or assist to regulate, the pressure of the member or members $q$. The loose pulley $p^2$ is preferably provided with a forked member $p^3$ or some other suitable device adapted to engage with the bilge keel $p^4$ or some other part of the ship in order to prevent the cables $c'$ and $c^2$ from fouling the bilge keel, a light line or the like $p^5$ being provided if required to assist in placing the member $p^3$ or the like in position. A similar or some other device is also provided to prevent cable $c^2$ from fouling the other bilge keel, for example, a forked member $p^6$ having a double pulley $p^7$ and held in position by a light cable or the like $p^8$, $p^8$ attached to the two ends of the fork $p^6$ and passing from boat to boat, or other supports, about the bottom of the ship, both forked members $p^3$ and $p^6$ being of sufficient width to insure their resting securely on the bilge keels and of dimensions to prevent any fouling of the cables and hull.

Referring to Figs. 9 and 10 the derrick arm $g$ which is mounted similarly to that referred to in connection with Fig. 1, is, in this modification which is the preferable form, double or forked as at $g$, $g$, the two branches diverging outward and the free ends thereof being provided each with a roller $g'$ or slide or other suitable device and, if required, a guard or guards as described in connection with Figs. 5 and 6, while distance pieces $g°$, $g°$ serve to strengthen the derrick arm. On each branch $g$, mounted on a common axle 2, are two loose pulleys $k'$ and $l'$ to respectively take the front and rear cable or the like $k$ and $l$ connected at one end to the stud rings on the cleaning device $h$, so that in this form of derrick there are four suspension cables or the like namely, two front ones $k$ and two rear ones $l$, which are let out or drawn in as required by means of drums $k^2$ and $l^2$ respectively. A loose pulley $n'$, also provided with a guard if desired, serves to guide the power conveyer or conveyers which, in this form of the apparatus, are electric wires preferably formed into a single cable $n$ which is unwound or wound up accordingly by means of a drum $m$ as the cables $k$ and $l$ are operated, although as described in connection with Fig. 4, the conveyer $n$ may, if desired, be a flexible shaft or a pipe for conveying pressure fluid. Also some suitable arrangement is made as referred to in connection with Fig. 4, to prevent the conveyer or conveyers $n$ being subjected to any undue strain. The drums are preferably all driven by any kind of motor but preferably an electric motor $o$, through the medium of a chain or other drive $p$, and by suitable adjustment of the cables or the like $k$, $k$ and $l$, $l$, the pressure of the actual cleaning member or members $q$ on the ship's hull is, as desired, either entirely or partly regulated, and, if required, the cleaning device can be tilted to the left or right, clutches (not shown) or some other suitable devices being provided to enable the drums $k^2$, $l^2$ and $m$ to be disconnected from each other as required, while the drum $l^2$ nearest the motor $o$ is also adapted to be disconnected therefrom in any suitable manner, whereby the drums can be rotated independently of one another, for which purpose hand cranks (not shown) or the like may be provided, so that the cables or the like $k$, $k$ and $l$, $l$ can be either drawn in or let out as required, or the drum $k^2$ nearest motor $o$ may be rotated by the said motor for this purpose. An arrangement similar to that described in connection with Figs. 2 and 3 is provided for raising and lowering the double derrick arm $g$, $g$ and the rings $r°$, $r°$ may be placed on the outer or inner side of arms $g$ $g$. Also the pulleys $k'$, $k'$ and $l'$, $l'$ may, if desired, be arranged in the middle of axle 2, that is one of each on both sides of pulleys $n'$, in which case the bearing at the free end of each arm $g$ would be modified accordingly.

In Fig. 9 the rear cables $l$, $l$ are shown slackened in dotted lines in order that the member or members $q$ may press more heavily against the ship's hull.

Referring to Figs. 11 to 13, the cleaning device $h$ hereinbefore mentioned is preferably worked by electricity, but as already indicated, other suitable motive power, compressed air for instance, could be used with the necessary varying modifications, the whole manipulation of the entire apparatus being effected by an operative or operatives outside the ship or the like being cleaned. In the cleaning device according to the present invention and which is preferably used, the casing of an electric motor A itself is water-tight and preferably of conical or conoidal form either convex or concave, and detachable, at one or both ends in order to give it a torpedo-like shape as shown in Fig. 11, and so enable the propeller, when used, to work effectively in the water, while fixed stud rings B are provided at the sides when the points, at which the cables or the like $k$, $l$ are connected, are fixed, the entire arrangement being such that when the device $h$ is suspended against the ship's hull from the derrick by the cables $k$, $l$, the inclination of the cables, from the pulleys $k'$, $l'$ downward, is away from the ship, as is also the case when the single arm derrick Fig. 2 is used, so that the tension causes the cleaning device $h$ to be forced toward the hull of the ship so that the actual cleaning member or members $q$ is or are kept pressed against the ship's hull, this arrangement assisting a propeller C to this end when the device $h$ works under water. If desired, water-tight ports (not shown) may be provided for inspection or repairing purposes in the casing A. Through an opening provided in the rear part of the said casing, where a packing gland D may be set, a shaft E passes on which the screw propeller C is mounted and which is preferably the armature shaft of the motor and is provided with a bearing and thrust block (not shown), while an opening is also placed preferably at the top of the motor casing and provided with a packing gland F for the inlet of the conveyer or conveyers $n$ (Figs. 2, 3 and 9) by which the current passes from a generator on a punt, lighter or boat or other supply source elsewhere. Packing glands G, G are provided in the front part of the motor casing through which a driving shaft H passes which is preferably mounted in ball races (not shown) and driven by the motor by worm gear or the like at I Fig. 14 (some parts being omitted) and coupled to continuation shafts J at K, Figs. 12 and 13. Preferably sprocket wheels L on the shafts J and chains M transmit the motion to sprocket wheels N on the spindle O of a revolving brush or brushes q or the like, although any other form of drive may be employed.

Tubing or other means Q held by brackets or the like R secured to the motor casing serve to support plates or framework S, S to hold bearings for the ends of shafts J, J and O and also the fixed shafts T of free running rollers or wheels U. Rollers or wheels V are mounted on movable arms W adapted to be adjusted by means of the slot $w'$ and the locking bolt $w^2$ secured to a lug $w^3$ on the framework S. By this means the pressure of the brush, brushes or the like q may be partly varied and the wear of the brushes allowed for, although other suitable means may be provided for the purpose.

When the cleaning device h is used for cleaning the bottoms of ships while in the water, a detachable air chamber or, as shown in Figs. 11 and 15, air chambers X are preferably fitted to it in order to increase the buoyancy, being secured in place, for instance, by means of bolts or other suitable means.

In operating the apparatus constituted according to the present invention, the punt, lighter, or boat or other support on which the means for carrying the cleaning device is mounted, is preferably moved along relatively to the hull of the ship, vessel or the like being cleaned five feet or so, at the desired intervals, in order to clean the hull in strips of say six feet, according to the length of the actual cleaning member or members q, whereby an overlap is caused. The hull of the ship, vessel or the like is in this way cleaned over that area which is usually submerged in the water and when the ship is cleaned while in the water, it may be, and preferably is, cleaned for some distance up the side above water level when, for instance, if the ship or the like is unloaded, unloading or loading, part of the hull which is under water at other times and which may require cleaning extends above the level of the water. Further, if desirable, the entire hull may be cleaned and not only those portions which are usually submerged.

Both in the arrangement where the pressure of the member or members q is regulated, either entirely or partly, by adjusting the cables or the like, or by adjusting the point or points of suspension, the cleaning device h is tilted more or less on rollers U or the like resting against the hull but, although not usual, the device h might rest against the ship's hull only on the members q, or on the adjustable rollers V or the like in such manner as to allow member or members q to operate on the ship's hull.

The derrick arm, whether single or otherwise, for instance, double with divergent or parallel branches, need not necessarily rest against the ship's hull during the cleaning operations, and when the said arm is adjustable, as it preferably is, it is adapted to pass, for example, in under the counter of the vessel when required, as shown in Fig. 3.

It is to be understood that the power for operating the cleaning member or members *per se* preferably also drives the propeller and, if desired, any other moving member or working parts. Further, in place of the brush or brushes referred to above, the cleaning device may be provided with a flexible brush or brushes, that is to say, the brushes are mounted so that they can, when required, assume various angles relatively to the cleaning device h, to enable them, for instance, to pass readily over curves or projections. Brushes other than rotary, such as reciprocating, may be used and other means, for example, electromagnets may be employed to keep, or assist to keep, the brushes or the like pressed against the ship's hull in place of the screw propeller, for instance, when working under water. It is also to be understood that although the cleaning device referred to in connection with the present invention is described as being suspended from a derrick carried by a punt, lighter or boat, and although this is the preferable arrangement, it may, according to the present invention, be suspended or be supported or held, with the necessary varied modifications, from any other means mounted separate from the ship to be cleaned, such as, a derrick or any other suitable device adapted in any suitable manner, for example, to traverse or to be moved along a wet, dry or floating dock, a wall, staging or any movable or immovable support which is exterior of, and separate from, the ship or the like and is supported on, or erected in, the water or on *terra firma*. Thus a harbor, dock or the like could be provided with a permanent arrangement including a cleaning device and a suitable derrick or other suitable device adapted to be moved, if necessary, from one locality to another in order to be used there to clean ships brought to the harbor or the like for this purpose and repairs might then also be effected simultaneously or the ship be loaded, unloaded or fitted out. Further, instead of moving the derrick along relatively to the ship's hull during the cleaning operations, the ship or vessel may be moved relatively to the stationary derrick or the like at the desired intervals.

Having now described my invention what I claim as new and desire to secure by Letters Patent is:—

1. An apparatus for cleaning the hulls of vessels, comprising in combination, a support floated beside the vessel to be cleaned, a member pivotally carried by said floated support and adapted to be raised and lowered derrick-wise to bear at points of vary-

UNITED STATES PATENT OFFICE.

FREDERICK GEORGE BROWNE, OF MALVERN, NEAR MELBOURNE, VICTORIA, AUSTRALIA.

APPARATUS FOR CLEANING THE HULLS OF SHIPS OR ANY KIND OF VESSEL.

1,079,208. Specification of Letters Patent. Patented Nov. 18, 1913.

Application filed August 5, 1912. Serial No. 713,308.

*To all whom it may concern:*

Be it known that I, FREDERICK GEORGE BROWNE, a subject of the King of Great Britain and Ireland, and residing at 38 Lambeth avenue, Malvern, near Melbourne, in the State of Victoria, Australia, have invented certain new and useful Improved Apparatus for Cleaning the Hulls of Ships or any Kind of Vessel, of which the following is a specification.

This invention relates to apparatus for cleaning the hulls of ships, vessels or the like, of the type in which a self acting cleaning device is suspended from a crane or derrick mounted upon a support exterior of the ship to be cleaned. In such apparatus as hitherto proposed, the self acting cleaner suspended from a floating lighter, normally hangs vertically and is pressed toward the hull by hand or mechanically operated devices in order that the cleaner may perform the work of removing the marine growth upon the hull of the ship. Such growth clings very tenaciously and requires a considerable amount of force to remove it. It has been found in practice by the devices hitherto proposed, that if the cleaner is forced on to the hull with any considerable force, such force is nullified by the insecure nature of the support carrying the apparatus, in other words, the lighter gives way in the opposite direction.

The object of the present invention is to overcome this drawback, and it primarily consists in so suspending the self acting cleaner that it is normally kept pressed against the hull by the influence of its own weight.

The invention also consists in providing means whereby when a floating lighter is used, it may be held rigidly to the hull being cleaned or may be moved along the hull when and as desired.

The invention further consists in means whereby the pressure of the self acting cleaner against the hull may be regulated.

Reference will now be made to the accompanying drawings illustrating the present invention diagrammatically and by way of example, in which:—

Figure 1 is a plan view showing the general arrangement when a punt, lighter, boat or the like is used in cleaning the hull of a ship. Fig. 2 is an end elevation thereof, drawn to a larger scale, but showing a single arm derrick. Fig. 3 is a similar view, but showing the counter of a ship. Fig. 4 shows a partial plan of one form of gear for operating the cleaning device, when using a single arm derrick. Figs. 5 and 6 show the free end of a single arm derrick in elevation and plan respectively. Fig. 7 is a diagram of two alternative ways of suspending a cleaning device. Fig. 8 is an end view of a general arrangement suitable when cleaning the bottoms of ships. Figs. 9 and 10 are a side elevation and a partial plan respectively of one form of the double or forked arm derrick and gear of Fig. 1. Figs. 11, 12 and 13 are respectively side elevation, plan and front elevation of a cleaning device, some parts being omitted, and Fig. 14 is a section on line 1—1 Fig. 11. Fig. 15 is a side elevation of one form of a detachable air chamber.

In Fig. 1 $a$ is the ship to be cleaned and $b$ is a punt, lighter or boat adapted to be moved along the side of the ship by means of a cable, hawser or the like $c$, connected to the latter in any suitable manner and passing one or more times as desired around a hand or power, but preferably an electric, winch or the like $d$ and over or around loose pulleys $e$. A derrick $f$ or the like preferably electrically operated and the arm $g$ of which (Figs. 2 and 3) is preferably mounted in any suitable manner so as to be adjustable to any desired angle and, if desired, is also adapted (not shown) to swing or rotate about a vertical axis, is mounted in or on the punt $b$ or the like and is adapted to raise and lower a cleaning device $h$, hereinafter referred to, and also to regulate or, in conjunction with rollers V and, when working under water, propeller C hereinafter mentioned, to assist to regulate, the pressure of the actual cleaning member or members thereof against the hull of the ship.

The derrick arm $g$, when adjustable, is adapted to be raised and lowered preferably by means of a separate electric or hand operated winch $g^2$, indicated diagrammatically in Figs. 2 and 3, and a steel or any other